United States Patent [19]

Leembruggen

[11] 4,146,104
[45] Mar. 27, 1979

[54] DRIVE ASSEMBLY

[76] Inventor: Lyndon R. Leembruggen, 20 Lutanda Close, Sydney, New South Wales, Australia

[21] Appl. No.: 813,616

[22] Filed: Jul. 7, 1977

[51] Int. Cl.² .............................................. B60K 7/00
[52] U.S. Cl. .................................. 180/65 F; 180/66 F; 280/713
[58] Field of Search ................ 180/65 F, 66 F, 64 M, 180/64 R, 58, 44 E, 44 F, 43 R, 52; 280/81 R, 713

[56] References Cited

U.S. PATENT DOCUMENTS

| 2,941,817 | 6/1960 | Benson | 280/713 |
|---|---|---|---|
| 3,049,361 | 8/1962 | Ronnino | 180/52 |
| 3,380,546 | 4/1968 | Rabjohn | 180/65 F |
| 3,477,536 | 11/1969 | Carini | 180/65 F |
| 3,608,661 | 9/1971 | Arnot et al. | 180/65 F |
| 3,612,204 | 10/1971 | Allen | 180/66 F |
| 3,645,406 | 2/1972 | Brazell | 180/66 F |
| 3,876,026 | 4/1975 | Pronasko | 180/52 |
| 3,892,300 | 7/1975 | Hapeman et al. | 180/65 F |
| 3,897,843 | 8/1975 | Hapeman et al. | 180/65 F |

Primary Examiner—David M. Mitchell
Attorney, Agent, or Firm—Emory L. Groff, Jr.

[57] ABSTRACT

A drive assembly comprising a power unit including a housing, wheel support means rotatably supported on the housing on bearing means encircling the housing and drive transmission means directly coupling a power output shaft of the power unit to the wheel support means to cause it to rotate relative to the housing.

7 Claims, 12 Drawing Figures

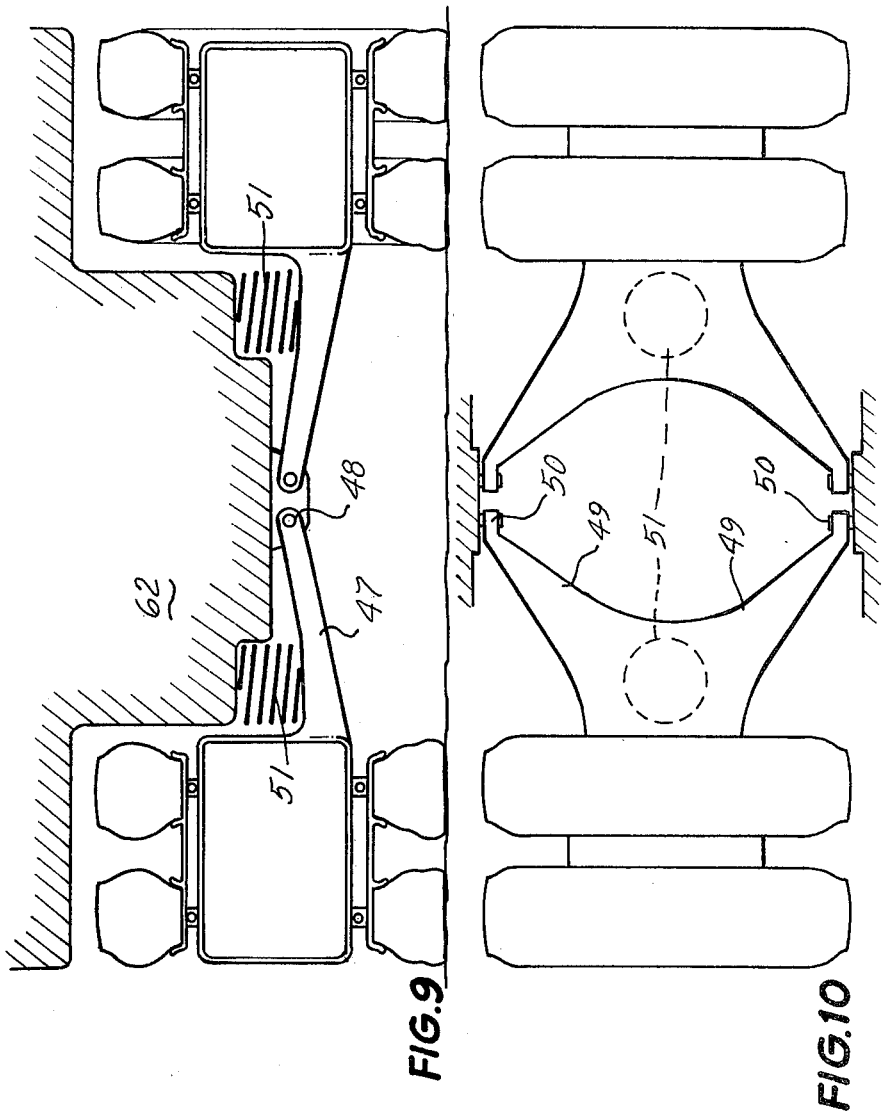
FIG. 9
FIG. 10
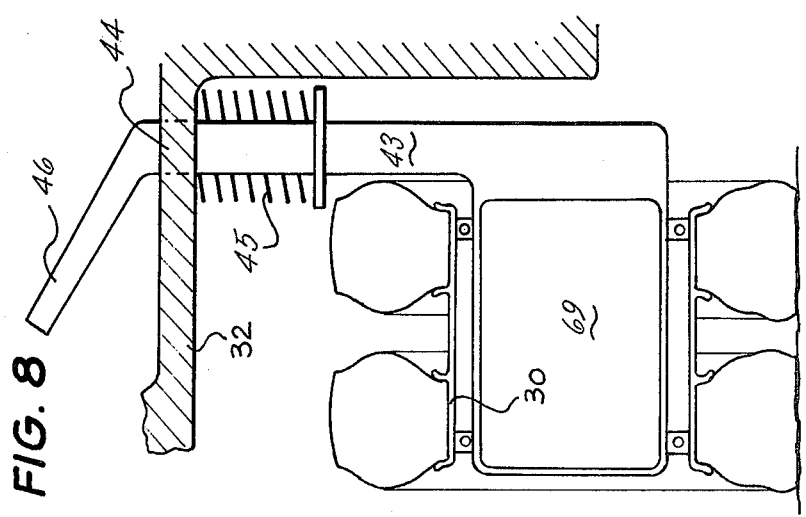
FIG. 8

DRIVE ASSEMBLY

This invention relates to a drive assembly for use on vehicles. The invention specifically provides an electrically or otherwise energized drive assembly for installation beneath or within a vehicle. Several such drive assemblies when mounted together below or within a vehicle could provide the drive system for the vehicle, some of said assemblies could be mounted as steerable wheel drive assemblies.

It has been a commonly held belief that a vehicle with each wheel driven by its own motor would provide a versatile and superior type of vehicle. It has been proposed to drive a vehicle in the aforementioned manner using electric motors, fluid motors or small internal combustion or turbine type motors, but is has proved difficult to provide an assembly which is simple, efficient, and lends itself to coupling to a vehicle through a suspension means which provides suitable ride characteristics for the vehicle and can also be rapidly removed for maintenance.

The present invention provides a drive assembly which fulfills all the foregoing requirements and can be broadly described as a drive assembly comprising a power unit including a housing, wheel support means rotatably supported on the housing on bearing means encircling the housing and drive transmission means directly coupling a power output shaft of the power unit to the wheel support means to cause it to rotate relative to the housing.

More specifically, the drive assembly can be described as a drive assembly comprising a frame adapted to be coupled to a vehicle body, road wheel supporting means rotatably supported by the frame, a power unit located within the road wheel supporting means and rotatably supported thereby, drive transmission means coupling an output shaft of the power unit to the wheel support means to cause it to rotate relative to the frame and the power unit, said power unit being adapted to be linked to a stationary portion of the vehicle by means resisting the reaction torque acting on the power unit as a result of it rotating the wheel supporting means.

The invention is described with reference to the accompanying drawings in which:

FIG. 6a is a diagrammatic end view of another embodiment.

FIG. 7 is a diagrammatic side view of the embodiment of FIG. 6a.

FIG. 8 is a diagrammatic end view of a further embodiment.

FIG. 9 is a diagrammatic end view of two further embodiments (one right hand and one left hand) mounted on a vehicle.

FIG. 10 is a plan view of the FIG. 9 embodiment; and

Figure 1:
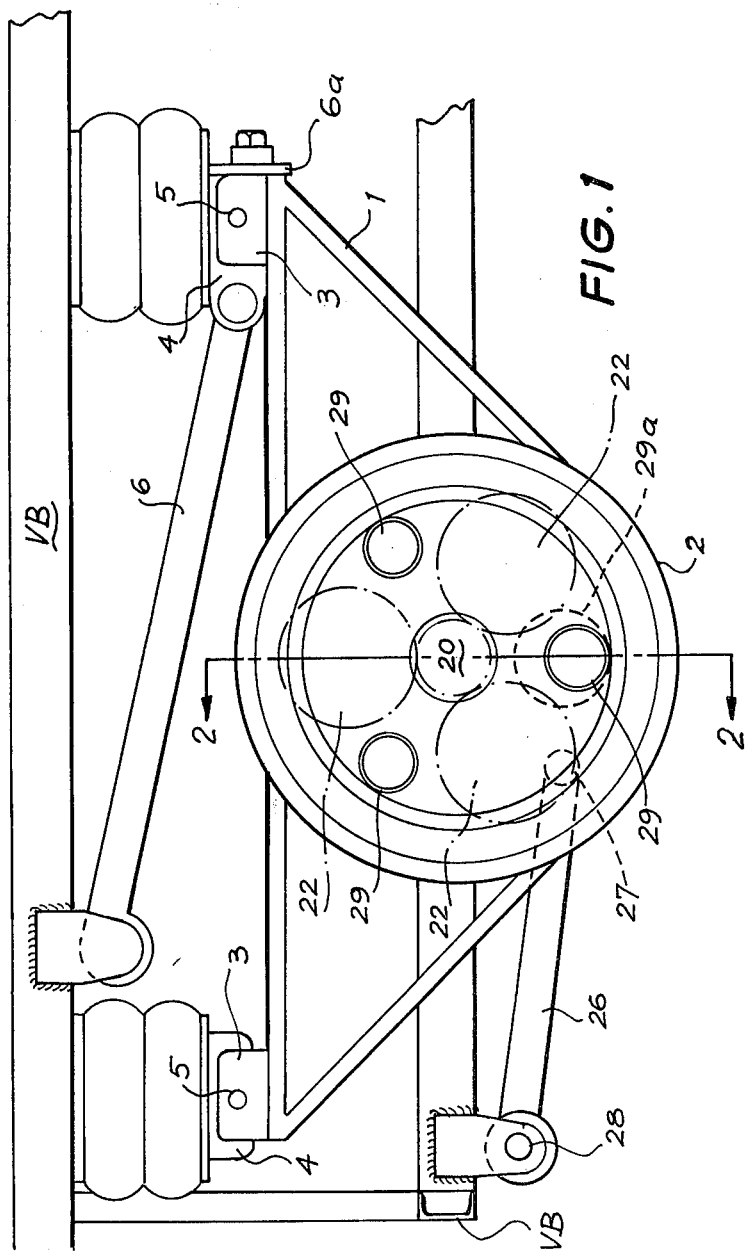
FIG. 1 is a side view of the present invention shown mounted in a vehicle but with brake means removed for the sake of clarity and FIG. 2 is a cross-sectional elevation on section line 2—2 of FIG. 1.
Figure 2:
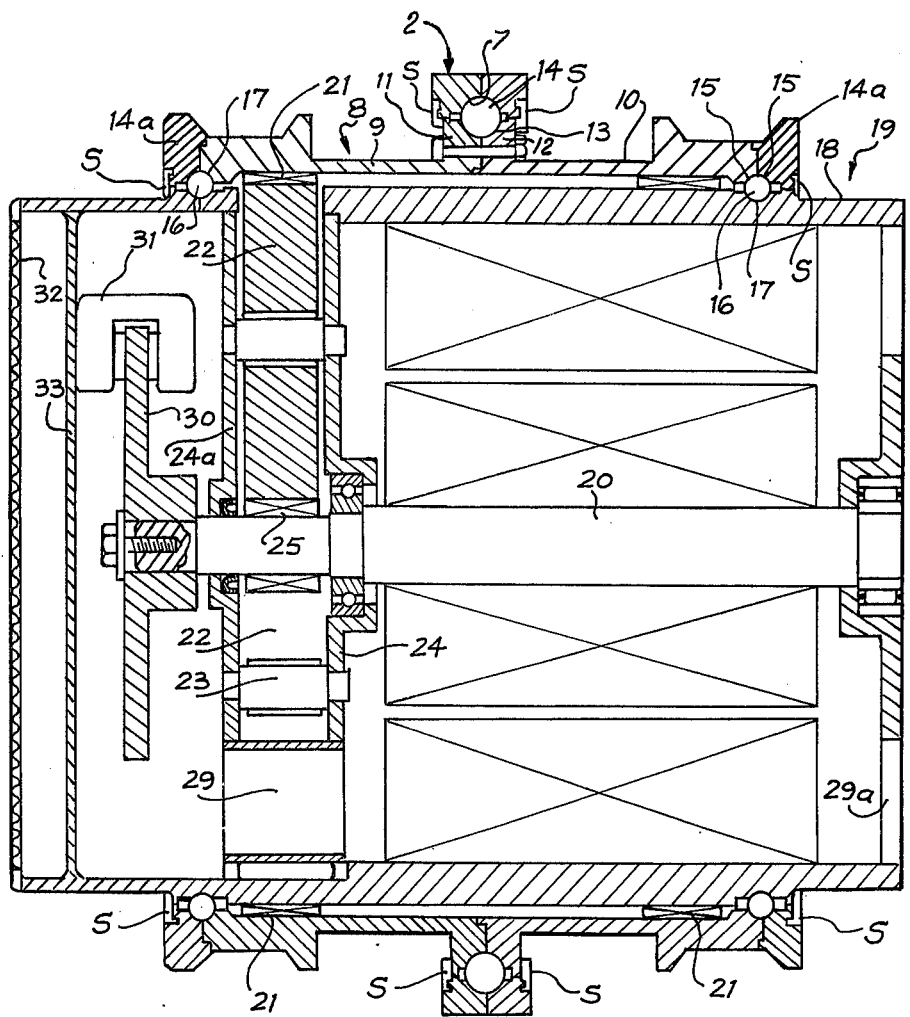
Figure 3:
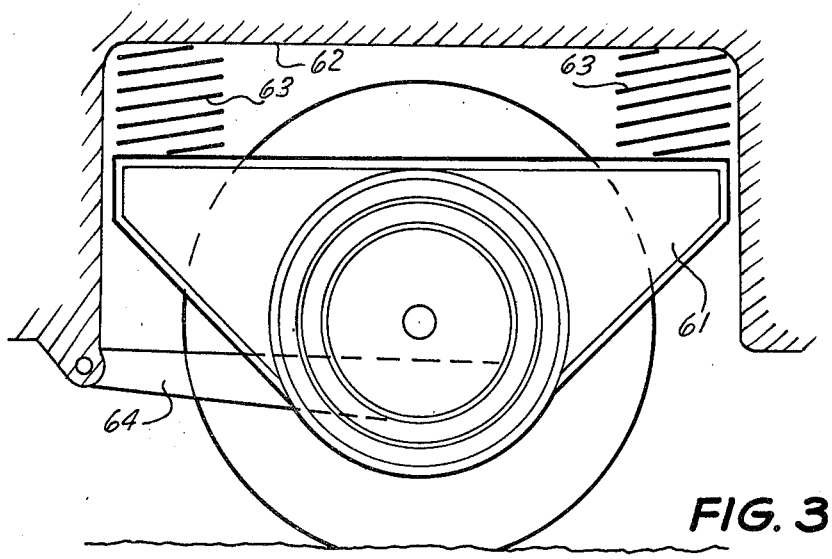
FIG. 3 is a diagrammatic side view of a spring supported motor-frame assembly for dual wheels with a single torque-reaction arm, with one tire removed for clarity.
Figure 4:
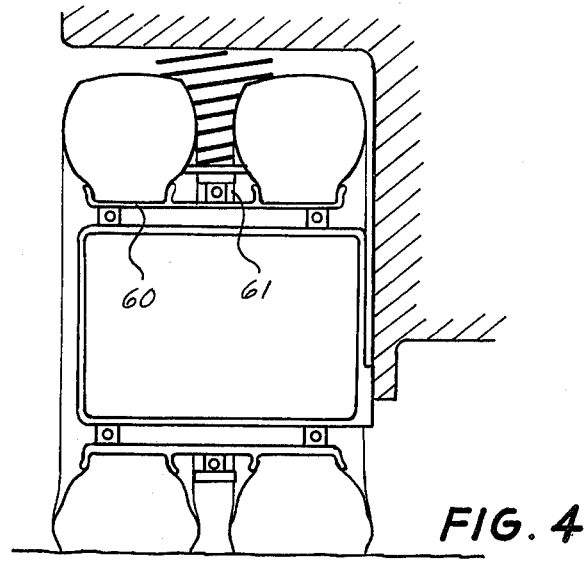
FIG. 4 is a diagrammatic end view of the FIG. 3 embodiment.
Figure 5:
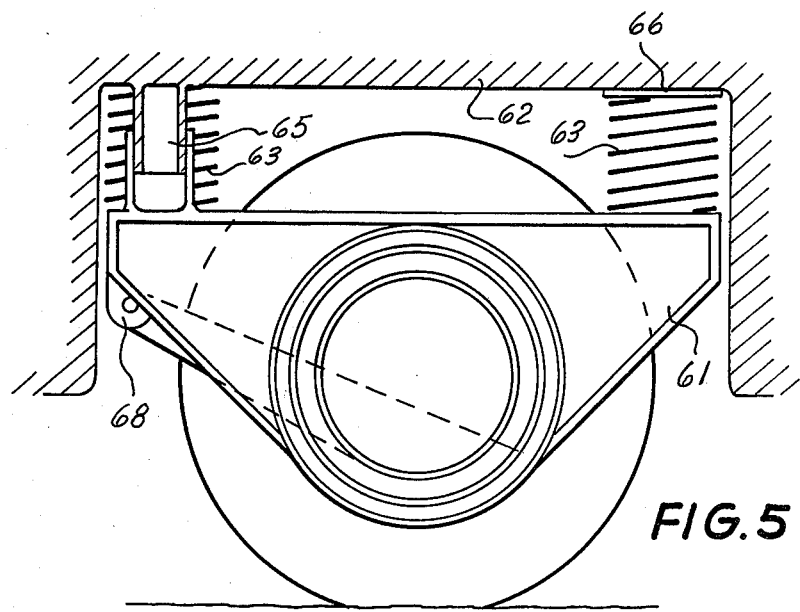
FIG. 5 is a diagrammatic side view of an assembly as shown in FIGS. 3 and 4 modified to perform as a steering wheel.

Referring to the drawings, the drive assembly comprises a frame 1 of generally triangular shape with an integral associated mounting ring 2. On each end of the frame 1 there is a lug 3 which fits between legs 4 at the bottom end of a suspension unit (e.g. air bags) fixed to the vehicle body V.B. The lug 3 is removably coupled to the legs 4 as at 5. Radius arms 6 and 6a connects legs 4 back to the vehicle body (V.B.) to respectively longitudinally and laterally locate the drive assembly relative to the vehicle body. The ring 2 is internally concavely grooved as at 7 to form portion of a track for a plurality of ball-bearings.

The wheel supporting means 8 (shown here as for supporting two wheels although with non-inventive modifications single or more than two wheels may be accommodated) is made up of two generally annular members 9 and 10 with peripheral shoulders 11 bolted together as at 12 and contoured as at 13 to provide approximately one quarter spherical bearings seats which combine with the groove 7 to make up an enclosing track for a plurality of ball-bearings 14. The members 9 and 10 each have a retaining flange 14a fixed to them, in a convenient manner, and at the junction of a retaining flange 14a with members 9 and 10 respectively, part spherical contours 15 are provided to form one part of a track for a plurality of ball-bearings 16. The other parts of the tracks for the ball-bearings 16 are grooves 17 formed in the outer surface of the casing 18 of a power unit 19 which is shown as an electric motor, a fluid or internal combustion or other motor with an output shaft 20 would be satisfactory as alternatives.

There is a ring gear 21 on the interior of the wheel supporting means 8. Three planetary gears 22 are rotatably mounted on stub shafts 23 between the power unit front plate 24 and a cover-plate 24a with the gears 22 passing through peripheral openings in the case 18 to mesh with ring gear 21. The gears 22 may be greater or fewer in number than three if required and mesh with a pinion gear 25 splined on to the shaft 20. From the drawings it is clear that if, the power unit 19 and frame 1 are located relative to the vehicle body and the shaft 20 rotates, the wheel supporting means 8 will be rotated on the rows of ball bearings 14 and 16. The frame 1 is located relative to the vehicle body by the members 3, 4, 5, 6 and 6a. The reaction torque resulting from the rotation of shaft 20 acting on wheels through the wheels supporting means 8 is resisted, by means of a radius rod 26 connected to a boss 27 on the power unit and a lug 28 on the vehicle body (V.B.). The boss 27 is located eccentric to the axis of shaft 20 and to one side of the line joining the axis of shaft 20 to the lug 28 in order to resist torque. The reaction torque resisting rod 26 and the arms 6 and 6a are all connected to the vehicle body (V.B.).

Tubes 29 connect the plates 24 and 24a and serve to exhaust cooling air received from an inlet 29a at the rear of the motor casing 18.

Braking in this example of the invention is achieved by means of a brake disc 30 fixed to the shaft 20 and rotating within a caliper unit 31 fixed to a transverse diametric supporting plate 33 fixed to a tubular extension of the motor casing 18. It is also to be noted that a perforated screen 32 is mounted across the tubular extension to prevent unauthorised access to the power unit, the gears and the brake assembly whilst still permitting the flow of cooling air through openings 29 and 29a.

Although ball-bearings have been shown as the low friction bearing means, rollers could be used or even large ball or roller bearing units could be used. In the latter case the contoured grooves 7-13 and 15-17 would be shaped to accept and securely hold the inner and outer race shells of such bearing units.

Lubrication of the bearings and gears by oil or grease is essential. Seals "S" form the spaces between the wheel supporting means 8 and the motor casing 18, and between the plates 24 and 24a and the space around the balls 14 into oil or grease reservoirs and exclude dust from the enclosed precision parts.

It is to be understood that with a single wheel assembly the centre line of the wheel would be disposed in the same plane as the centre line of the frame 1, this could readily be achieved by modification of the various members in a non-inventive manner.

From the foregoing description it will be seen that the drive assembly can be readily removed simply by disconnecting the radius rod 26 and disconnecting the brackets 3 from the legs 4 of the suspension unit.

In a situation where the drive assembly is on a steerable wheel the radius rod 6 is deleted and at one end the frame 1 is disconnected from its suspension means. A bearing plate under the disconnected suspension means slidingly rests on a transverse bar connecting the said one end of the frame 1 to steering means and in this way the said one end of the frame 1 is vertically retained. At the other end of the frame 1 the radius rod 6a is universally connected to the suspension unit. Pivotal movement of the frame 1 relative to the vehicle body is about an axis running vertically through the suspension unit at said other end of said frame 1.

The manner of mounting the drive assembly may be varied from the specific arrangements just described to suit requirements and several modes of mounting will now be described with reference to the accompanying drawing FIGS. 3 to 11 which also diagrammatically illustrate the previously described arrangements.

Figure 6:
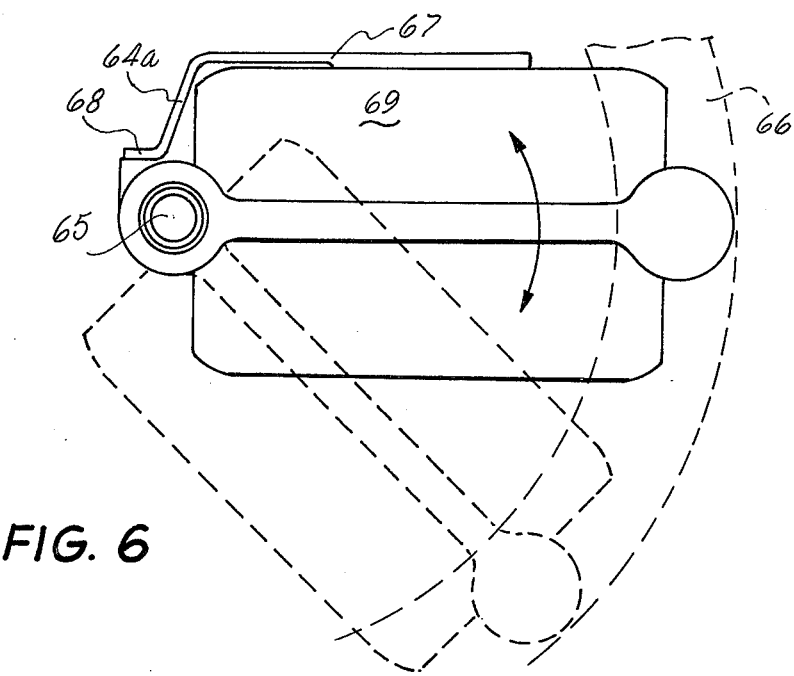
FIG. 6 is a diagrammatic view from above of the motor-frame assembly of FIG. 5 with the wheels removed.
Figures 6A, 7:
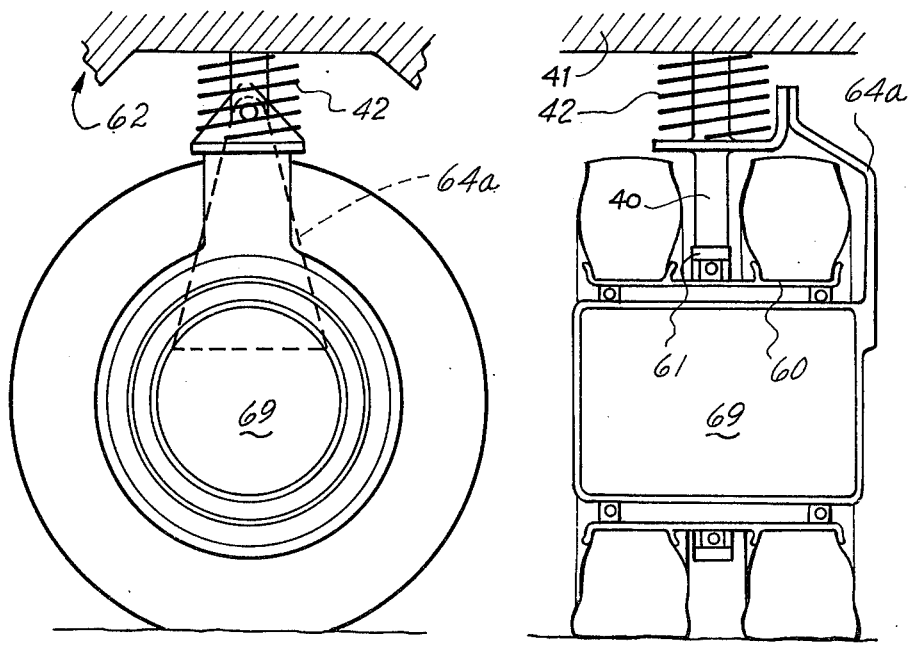
Figure 11:
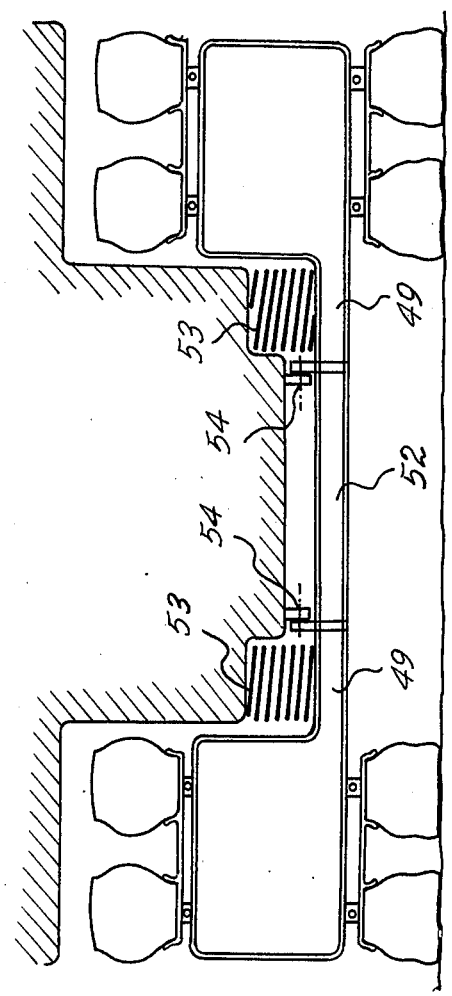
FIG. 11 is a diagrammatic view of two further embodiments (one left hand and one right hand) mounted on a vehicle.

In a first mode as previously described (see FIGS. 3 and 4) the wheel support means 60 is rotatably supported in a frame 61 which is releasably mounted on the body of a vehicle 62. The frame is resiliently mounted on springs 63 and a torque reaction arm 64 is used to resist the reaction torque which would tend to place the frame mounting springs 63 under severe torque condition during operation of the vehicle. It will be seen that the frame 61 is held so that the axis of rotation of the wheel support means 60 is transverse to the normal direction of vehicle travel. In a development of the foregoing (see FIGS. 5 and 6) the frame 61 is pivotally connected as at 65 to the vehicle body 62 to provide "steering" capabilities. In this case the axis of rotation of the wheel supporting means could vary widely from the aforementioned transverse position. This is possible due to the ability of the rear spring 63 being in sliding engagement with a bearing plate 66. A dotted alternative position is shown in FIG. 6 indicating just one position which could be attained in a steering movement. The torque arm 64a is connected at 67 to the motor housing 69 and at 68 to the pivot shaft 65.

Another steerable version of this arrangement (see FIGS. 6a and 7) would include a column 40 fixed to the frame 61 which column is rotatably and resiliently mounted in bearing means 41 on the vehicle body 62 by spring 42. The torque reaction arm 64a in such an arrangement would couple the motor housing 69 to the column 40 as described with reference to FIG. 6.

In another mode (see FIG. 8) the housing 69 would not be rotatably supported in a frame 61 but is provided with an upstanding column 43 which would be rotatably mounted in bearing means 44 on the vehicle body 62 having a suspension spring 45. One such arrangement could be used as a single steering assembly for a vehicle. Two such assemblies linked together by arm 46 can provide a pair of steering wheels for the vehicle. Additional wheels can be used to provide multiple wheel steering assemblies.

In another mode (see FIGS. 9 and 10) the housing 69 is provided with an arm assembly 47 which can be either of the single substantially horizontal type (as shown in FIG. 9) pivotally mounted at 48 to the vehicle body 62 with tie members (not shown) to maintain the rotational axis of the wheel transverse to the vehicle direction of travel. Alternatively the arm assembly can be as shown in FIG. 10 with two limbs 49 widely spaced apart adapted to be pivotally connected at 50 to the vehicle body 62 so as to pivot about an axis parallel to the direction of vehicle travel. The resultant position of the axis of wheel rotation would again be transverse to the direction of vehicle travel. In this way there would be no need for the tie members referred to above. The resultant suspension would be similar to the "independent wishbone" suspension as now commonly used on vehicles. The arms would be resiliently supported from the vehicle body 62 by springs or other suspension means 51 to absorb road shocks.

In yet another mode (see FIG. 11) the single arm assembly 47, referred to above, would be joined to another like combination by a beam 52, resilient suspension 51 would be located between the arms 49 and the vehicle body 62 to provide a "beam axle" type arrangement as is commonly known. Torque reaction arms 54 would be used to locate the beam axle transverse to the vehicle body.

I claim:

1. A drive assembly comprising three interconnected parts namely a frame, means on the frame to couple it to a vehicle body and a rotatable wheel supporting means encircled by the frame, first bearing means rotatably mounting said wheel supporting means in the frame, a power unit including an output shaft and encircled by said wheel supporting means, second bearing means between said wheel supporting means and said power unit, drive transmission means coupling said output shaft of said power unit to said wheel supporting means to cause it to rotate within the frame and around the power unit and torque reaction means coupling said power unit to said vehicle body to prevent relative rotational movement therebetween.

2. A drive assembly as claimed in claim 1 wherein the frame is generally triangular and has an internal bearing mounting ring, an exterior bearing mounting ring on the wheel supporting means, said first bearing means being disposed between said internal and said external bearing mounting rings.

3. A drive assembly as claimed in claim 2 including inner bearing mounting means on the wheel supporting means and outer bearing mounting means on said power unit and said second bearing means is housed therebetween.

4. A drive assembly as claimed in claim 2 wherein said wheel supporting means comprises a pair of generally annular members secured together in edge abutting relationship, the abutting edges forming the outer bearing mounting means of said wheel supporting means.

5. A drive assembly as claimed in claim 1 wherein the transmission means comprises a gear means on the output shaft of the drive unit meshing with a plurality of planetary gears rotatably mounted on a common pitch circle on the power unit and meshing with a ring gear disposed internally in said wheel supporting means.

6. A drive assembly as claimed in claim 1 wherein said power unit is an electric motor.

7. A drive assembly as claimed in claim 1 wherein said power unit is a fluid motor.

* * * * *